United States Patent
Slabaugh et al.

(10) Patent No.: US 8,094,904 B2
(45) Date of Patent: Jan. 10, 2012

(54) METHOD AND SYSTEM FOR BONE SUPPRESSION BASED ON A SINGLE X-RAY IMAGE

(75) Inventors: Gregory G. Slabaugh, London (GB); Tong Fang, Morganville, NJ (US); Kooksang Moon, North Brunswick, NJ (US); Yunqiang Chen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 757 days.

(21) Appl. No.: 12/283,441

(22) Filed: Sep. 12, 2008

(65) Prior Publication Data

US 2009/0087070 A1    Apr. 2, 2009

Related U.S. Application Data

(60) Provisional application No. 60/975,295, filed on Sep. 26, 2007.

(51) Int. Cl.
*G06K 9/00* (2006.01)
(52) U.S. Cl. .......................................... 382/130; 378/62
(58) Field of Classification Search ................ 378/62, 378/51, 98, 98.9, 98.11, 98.12; 382/128, 382/130

See application file for complete search history.

(56) References Cited

U.S. PATENT DOCUMENTS

| | | | |
|---|---|---|---|
| 6,614,874 B2 | 9/2003 | Avinash | |
| 6,661,873 B2 | 12/2003 | Jabri et al. | |
| 6,754,298 B2 | 6/2004 | Fessler | |
| 6,792,072 B2 | 9/2004 | Avinash | |
| 6,816,572 B2 | 11/2004 | Jabri et al. | |
| 6,917,697 B2 | 7/2005 | Avinash et al. | |
| 7,068,826 B2 | 6/2006 | Jabri et al. | |
| 2005/0100208 A1* | 5/2005 | Suzuki et al. | 382/157 |

OTHER PUBLICATIONS

Loog, M. et al., "Filter Learning: Application to Suppression of Bony Structures from Chest Radiographs", Medical Image Analysis, 10:826-840, 2006.
Suzuki, Kenji et al., "Image-Processing Technique for Suppressing Ribs in Chest Radiographs by Means of MTANN", IEEE Trans. Medical Imaging, 25(4);: 406-416, 2006.

* cited by examiner

Primary Examiner — Hoon Song

(57) ABSTRACT

A method and system for suppressing bone structures based on a single x-ray image is disclosed. The bone structure suppressing method predicts a soft-tissue image without bone structures from an input x-ray image. A set of features is extracted for each pixel of the input x-ray image. A soft-tissue image is then generated from the input x-ray image using a trained regression function to determine an intensity value for the soft-tissue image corresponding to each pixel of the input x-ray image based on the set of features extracted for each pixel of the input x-ray image. The extracted features can be wavelet features and the regression function can be trained using Bayesian Committee Machine (BCM) to approximate Gaussian process regression (GPR).

30 Claims, 7 Drawing Sheets

METHOD AND SYSTEM FOR BONE SUPPRESSION BASED ON A SINGLE X-RAY IMAGE This application claims the benefit of U.S. Provisional Application No. 60/975,295, filed Sep. 26, 2007, the disclosure of which is herein incorporated by reference.

BACKGROUND OF THE INVENTION

The present invention relates to x-ray imaging, and more particularly, to suppressing bone structures based on a single x-ray image.

Chest radiography (i.e., x-ray imaging) is a frequently used imaging technique for the diagnosis of chest diseases, such as lung cancer, pneumoconiosis, and pulmonary emphysema. However, it is difficult to detect lung nodules (i.e., potential lung cancers) in a conventional chest radiograph (x-ray image) because lung nodules are often obscured in chest radiographs by overlying bones, such as ribs and clavicles. Even with a computer-aided diagnostic (CAD) scheme for nodule detection, it can be challenging to detect nodules in chest radiographs when bones overlap with the nodules.

A conventional solution to this problem is to use dual energy imaging in order to separate a chest radiograph into a bone image and a soft-tissue image. FIG. 1 illustrates dual energy imaging. As illustrated in FIG. 1, images 102 and 104 are dual energy images. In dual energy imaging, in addition to normal exposure for a standard radiograph, a patient receives extra x-ray exposure at a lower energy to acquire a second radiograph, resulting in a high-energy x-ray image and a low-energy x-ray image. In FIG. 1, image 102 is the high-energy image and image 104 is the low-energy image. A sensor array is used to capture the x-rays that transverse through the patient. Since the attenuation coefficients of bone and soft tissue follow different functions of energy, the two images can be weighted and then subtracted to generate separate images for soft tissue and bone structure. In FIG. 1, image 106 is a bone image and image 108 is a soft-tissue image.

Despite the advantages of dual energy imaging, many hospitals do not use dual energy imaging because specialized equipment is required. Also, dual energy imaging requires extra x-ray exposure for patients, such that the radiation dose can be greater than the recommended amount for obtaining standard radiographs. Accordingly, a method for suppressing bone structures in an x-ray image without using dual energy imaging is desirable.

BRIEF SUMMARY OF THE INVENTION

The present invention provides a method for suppressing bone structures in an x-ray image. Embodiments of the present invention utilize a learning-based regression model for predictive bone suppression in an x-ray image without using dual energy imaging. Such a regression model predicts a soft-tissue image without bone structures from an input x-ray image In one embodiment of the present invention, an x-ray image is received. A set of features is extracted for each pixel of the x-ray image. The extracted features may be wavelet features. A soft-tissue image is generated from the x-ray image using a trained regression function to determine an intensity value for the soft-tissue image corresponding to each pixel of the x-ray image based on the set of features extracted for each pixel of the x-ray image. The regression function can be trained using Bayesian Committee Machine (BCM) to approximate Gaussian process regression (GPR). The x-ray image may be normalized prior to extracting the features and the dimensionality of the set of features for each pixel may be reduced prior to generating the soft-tissue image.

In another embodiment of the present invention, multiple sets of training images, each set of training images having a training x-ray image and a corresponding training soft-tissue image, are received. A set of features, such as wavelet features, is extracted for each pixel in each of the training x-ray images. A regression function to suppress bone structures in x-ray images is trained based on the extracted wavelet features for the training x-ray images and the corresponding training soft-tissue images. The regression function may be trained using BCM to approximate GPR. The training x-ray images and the corresponding training soft-tissue images may be normalized prior to extracting the features, and the dimensionality of the features may be reduced prior to training the regression function.

These and other advantages of the invention will be apparent to those of ordinary skill in the art by reference to the following detailed description and the accompanying drawings.

DETAILED DESCRIPTION

The present invention is directed to a method for suppressing bone structures in x-ray images. Embodiments of the present invention are described herein to give a visual understanding of the bone structure suppression method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
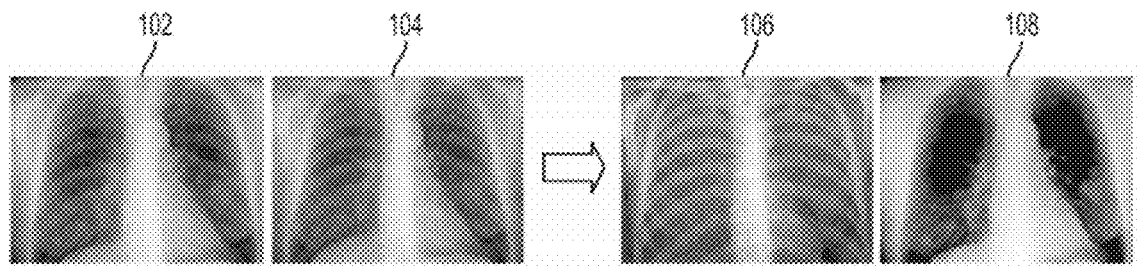
FIG. 1 illustrates dual energy imaging.
Figure 2:
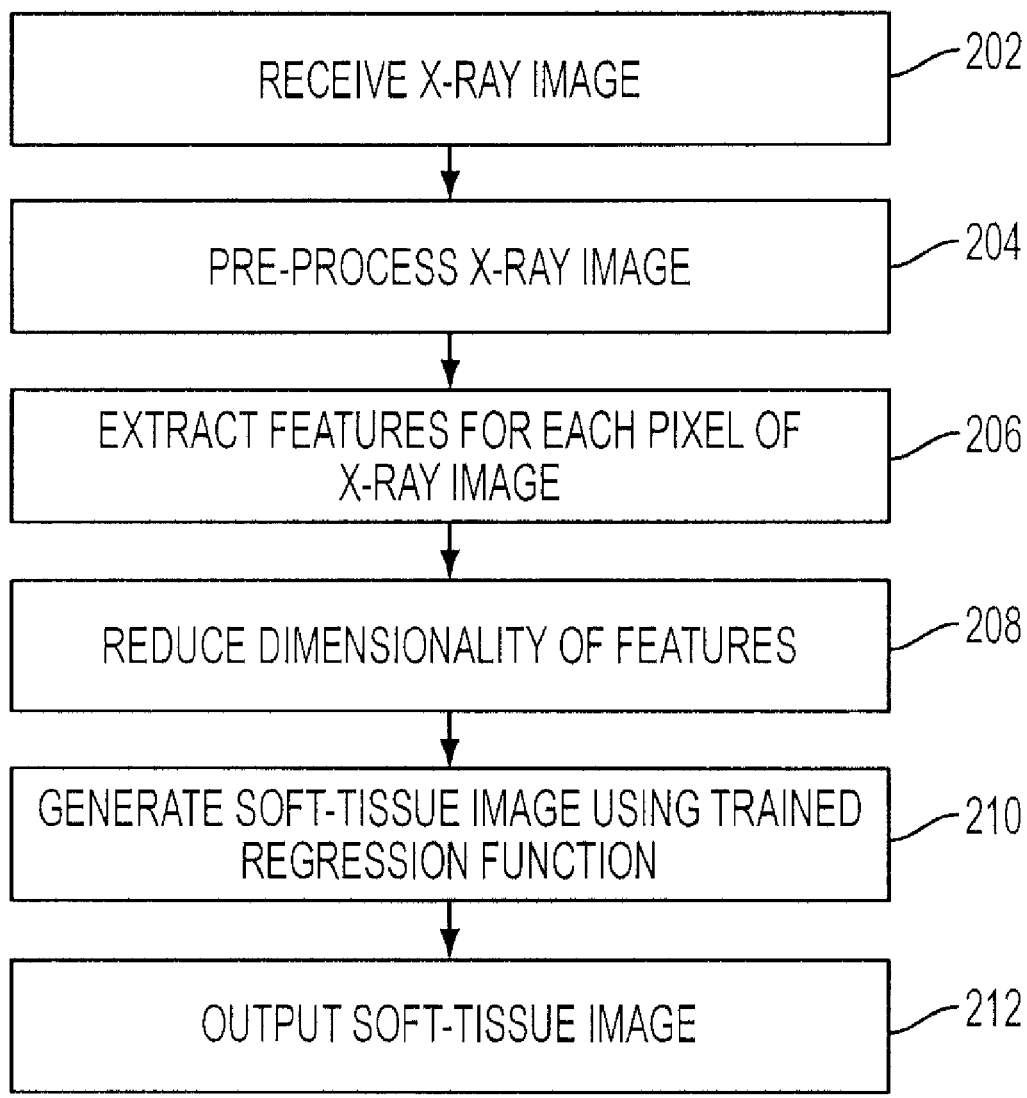
FIG. 2 illustrates a method for suppressing bone structures based on a single x-ray image according to an embodiment of the present invention.

Embodiments of the present invention utilize a learning-based regression model for predictive bone suppression in an x-ray image. The regression model estimates a soft-tissue image from an input x-ray image (radiograph). The regression model is trained using training data of known input (x-ray image) and output (soft-tissue image) pairs. For example, soft-tissue images extracted from x-ray images using dual energy imaging can be used as training data to train the regression model. The regression model predicts bone structures in the input x-ray image, and subtracts the predicted bone structures to generate an estimated soft-tissue image. Embodiments of the present invention generate a soft-tissue image from single input x-ray image FIG. 2 illustrates a method for suppressing bone structures based on a single x-ray image according to an embodiment of the present invention. The method of FIG. 2 generates a soft-tissue image without bone structures from an input x-ray image. At step 202, an x-ray image is received. The x-ray image can be a chest radiograph. The x-ray image, or radiograph, can be received directly from an x-ray imaging device that is used to obtain the x-ray image. It is also possible that the x-ray image can be received by loading a previously obtained x-ray image stored in memory or storage of a computer system or other computer readable medium.

At step 204, the x-ray image is pre-processed to remove noise and normalize the input image data. In training of the regression model used in the method of FIG. 2, pre-processing of the training data step can reduce overfitting of the learned regression model to the training data. This pre-processing is advantageous when the regression model is trained using training data from a different source than the image data to be tested (i.e., the received x-ray image).

According to a possible implementation, Gaussian blurring can be used to normalize the x-ray image. A normalized image $\bar{I}$ is calculated from an original image I as:

$$\bar{I} = \frac{I - I_\sigma}{\sqrt{(I^2)_\sigma - (I_\sigma)^2}}. \quad (1)$$

Figure 3:
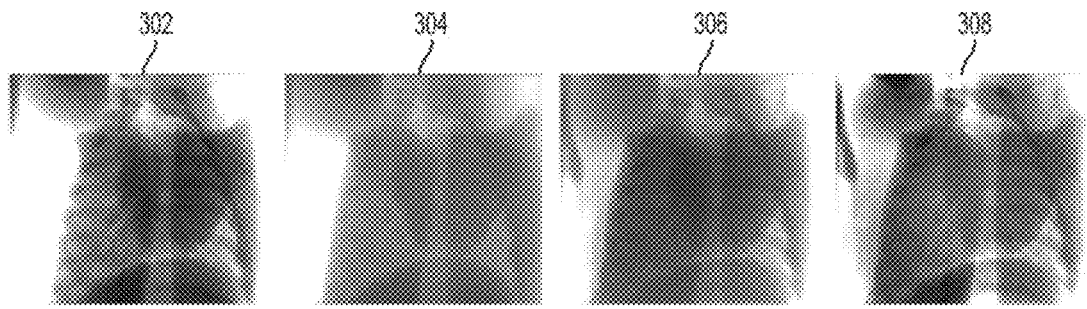
FIG. 3 illustrates image normalization using Gaussian blurring.

The received x-ray image, as well as the x-ray images and corresponding images of the training data, can be locally normalized on a large scale σ (e.g., σ=128 for a 512 by 512 image) multiple times. For example, 6 iterations of normalization can be used. FIG. 3 illustrates image normalization using Gaussian blurring. As illustrated in FIG. 3, images 302 and 304 are a low-energy x-ray image and a corresponding soft-tissue image, respectively, which are training data for training a regression function. Image 306 shows results of normalizing image 302 after one iteration of Gaussian blurring, and image 308 shows the results of normalizing image 304 after six iterations of Gaussian blurring. It is to be understood that the present invention is not limited to Gaussian blurring normalization, and other normalization techniques, such as histogram normalization, may be used as well.

Returning to FIG. 2, at step 206 a set of features are extracted for each pixel of the x-ray image. Although the feature extraction is a domain dependent problem, various types of image features can be used. For example, Gaussian filters or wavelets that emphasize edge characteristics of bone structures can be used to extract image features.

Figure 4:
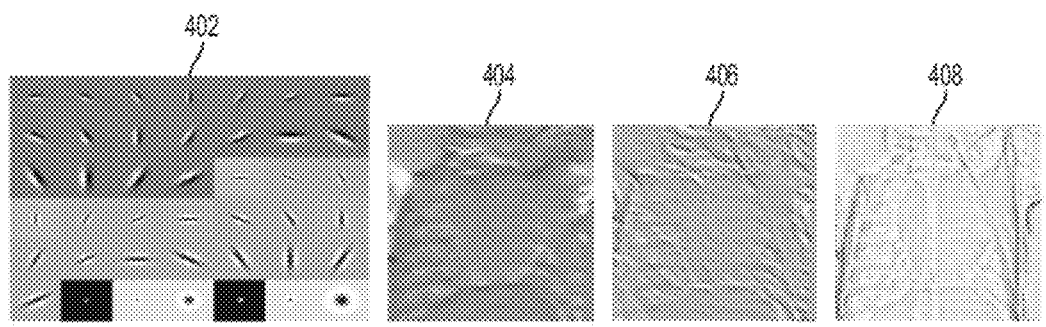
FIG. 4 illustrates a filter bank and exemplary feature images extracted using the filter bank.

It is possible to extract image features using Gaussian filters. In order to extract features for each pixel of the x-ray image using Gaussian filters, a filter bank can be used to filter each pixel with a variety of filters. For example, the Leug-Malik (LM) filter bank, which was originally developed for natural textual recognition under varying viewpoints and illumination, can be used to extract the features. This filter bank is a multi-scale and multi-orientation filter bank that consists of 48 filters (36 built from first and second derivatives of Gaussian filters at six orientations and 3 scales, 8 center-surround difference of Gaussian filters, and 4 low-pass Gaussian filters). For radiograph images of size 128 by 128, the first and second derivative filters occur at the first three scales $\sqrt{2}$, 2, and $2\sqrt{2}$ with an elongation factor of 3 (i.e., $\sigma_x=\sigma$ and $\sigma_x=3\sigma$). FIG. 4 illustrates the LM filter bank and exemplary feature images extracted using the filter bank. As illustrated in FIG. 4, image 402 shows the LM filter bank. In order to extract features using the LM filter bank 402, each pixel in an x-ray image is filtered by each filter in the filter bank 402, resulting in a set of features for each pixel. The feature values extracted using a particular filter for each pixel of an image can be viewed as a feature image. Image 404 shows a feature image generated using the $1^{st}$ filter of the LM filter bank 402. Image 406 shows a feature image generated using the $20^{th}$ filter of the LM filter bank 402. Image 408 shows a feature image generated using the $41^{st}$ filter of the LM filter bank 402.

Figure 5:
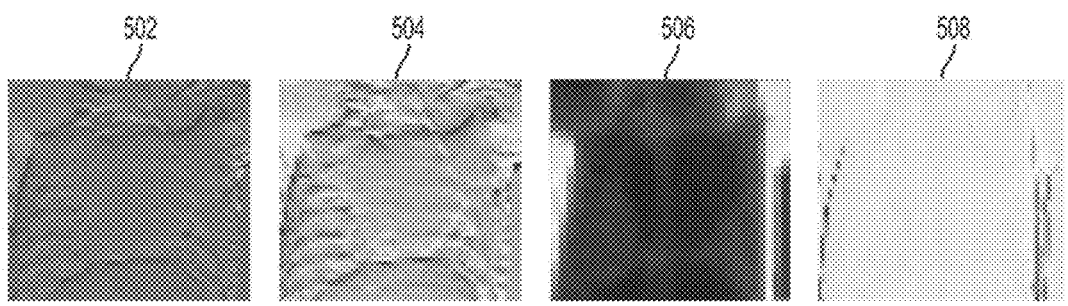
FIG. 5 illustrates feature images generated using exemplary wavelets.

According to an advantageous implementation, the image features can be extracted using wavelets. Wavelet analysis provided a versatile collection of tools for image analysis and manipulation. Wavelets are mathematical basis functions that can represent image data with different frequency components in a resolution matched to their scales. Thus, wavelet analysis of an image analyzes the image according to the scale of the image. In order to extract a set of wavelet features for each pixel of the x-ray image, multiple wavelets corresponding to multiple scales of the x-ray image are used to evaluate the x-ray image at each pixel. The set of wavelet features for a given pixel is a vector of the calculated wavelet values for that pixel. FIG. 5 illustrates feature images generated using exemplary wavelets. As illustrated in FIG. 5, images 502, 504, 506, and 508 are exemplary wavelet feature images generated using the publically available WAVELAB 850 Matlab toolbox. In generating the wavelet feature images, the Haar wavelet can be used at 5 scales. The image features extracted using wavelet analysis may show small variation between different input x-ray images. This may allow the bone structures in an x-ray image to be suppressed without the image pre-processing step. Accordingly, it may be advantageous to utilize wavelet image features for the learning based regression used for bone structure suppression.

Returning the FIG. 2, at step 208, the dimensionality of the features extracted for each pixel of the x-ray image is reduced. In a regression problem, it can be important to select the right features. When a large set of features is available, reducing the dimensionality of the feature vector for each pixel can improve the accuracy of the estimation in regression. There are various well-known dimensionality reduction approaches that can be used for various applications. Principle component analysis (PCA) is a well-known linear technique for performing a linear mapping of data in high dimensional space to a lower dimensional space in a way such that the variance of the data in the low dimensional space is maximized. Accordingly, the dimensionality of the feature vector for each pixel can be reduced using PCA. Another possible method for reducing the dimensionality of the feature vector is linear dimensionality reduction for regression (LDRR). LDRR is a heuristic approach based on local dimensionality reductions that are combined in a single global linear mapping. There are also various non-linear dimensionality reduction techniques that construct a non-linear mapping using a kernel trick, such as locally linear embedding (LLE) and isometric feature mapping (Isomap).

At step 210, a soft-tissue image is generated using a trained regression function. The soft-tissue image is an image without bone structures estimated from the original x-ray image. The soft-tissue image is generated from the original x-ray image by the trained regression function based on the extracted features. Accordingly, the trained regression function predicts the bone structures in the x-ray image based on the extracted features and subtracts the predicted bone structures from the x-ray image to generate the soft-tissue image.

Regression analysis is a statistical tool for determining and measuring a relationship among variables. In particular, regression analysis is used to determine a relationship between the input (independent, predictor) variable x and the output (dependent, response) variable y, where x is a d-dimensional vector and y is a scalar value. This statistical relationship can be mathematically formulated as:

$$y = f(x) + \epsilon, \quad (2)$$

where $\epsilon$ is a random error variable. For bone suppression in an x-ray image, x represents the feature vector for a pixel of the input x-ray image, and y represents a predicted pixel intensity value for the corresponding pixel of the soft-tissue image. In order to predict a pixel intensity y based on a set of features x, a regression function $f$ is trained (learned) that represents the relationship between x and y based on the observed data $D=\{(x_i, y_i)\}_{i=1}^{N}$. The regression function $f$ is training based on training data of known corresponding x-ray and soft-tissue images. The trained regression function $f$ is used to generate the soft-tissue image by estimating a pixel intensity y for each pixel in the soft tissue image based on the set of features x extracted for the corresponding pixel in the original x-ray image.

A well-known approach for training a regression function is simple linear regression, where $f$ is a linear function of the input and the parameters. However, this approach may be too limited to perform well for bone suppression in x-ray images. Various other methods may be used to train the regression function, such as k-Nearest-Neighbor regression (kNNR), support vector regression (SVR), Gaussian process regression (GPR), boosting based regression, and artificial neural networks. According to an advantageous implementation, the regression function can be trained using GPR approximated using a Bayesian Committee Machine (BCM). The training of the regression function is described in greater detail below.

At step 212, the soft-tissue image is output. The soft-tissue image generated using the trained regression function can be output by displaying the soft-tissue image, for example on a display device of a computer system. The soft-tissue image can also be output by storing the generated soft-tissue image, for example on a computer readable medium, storage, or memory of a computer system.

Figure 6:
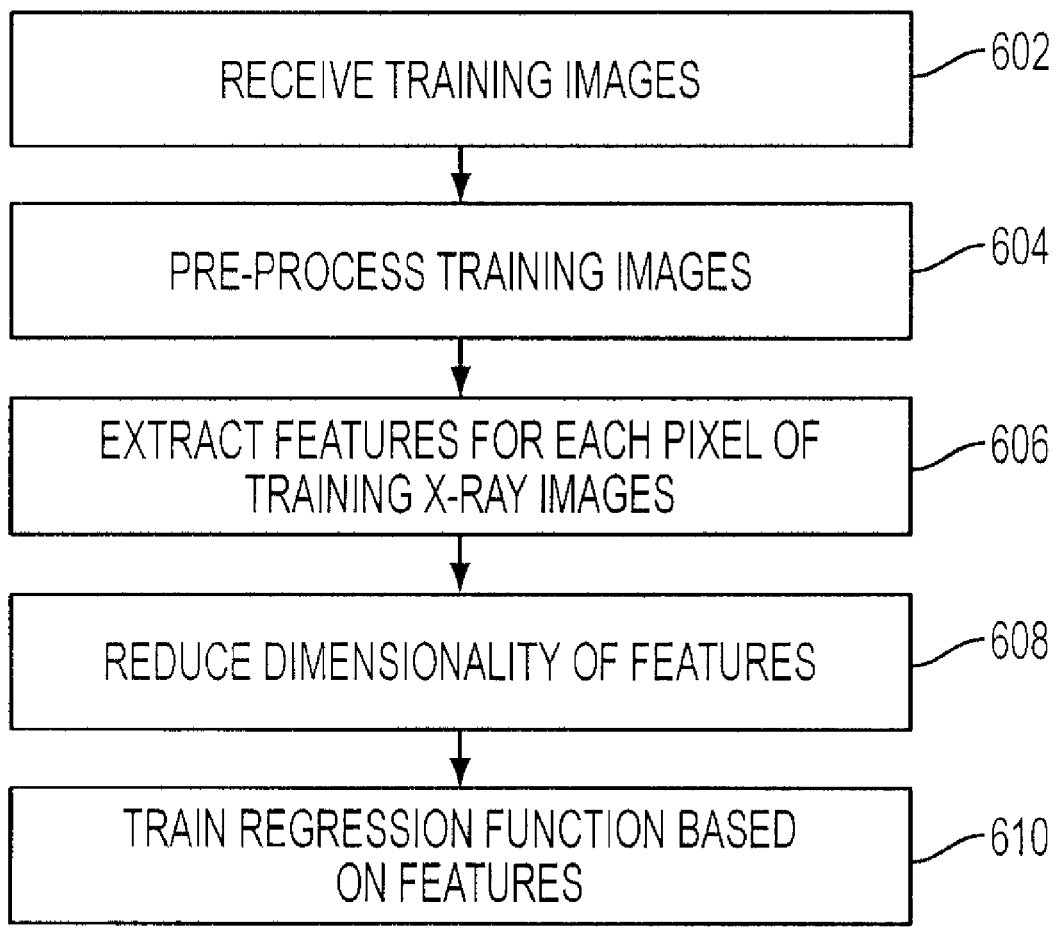
FIG. 6 illustrates a method for training a regression function for bone suppression in x-ray images according to an embodiment of the present invention.

FIG. 6 illustrates a method for training a regression function for bone suppression in x-ray images according to an embodiment of the present invention. The method of FIG. 6 can be used to train the regression function used in step 210 of FIG. 2 for generating a soft-tissue image from an input x-ray image. At step 602, training images are received. The training images are pairs of images, each pair including an x-ray image (e.g., a standard low-energy radiograph) and a corresponding soft-tissue image. The training images may be generated using dual energy imaging to obtain the soft-tissue images from the corresponding x-ray images. The x-ray images are used as input examples and the corresponding soft-tissue images are used as output examples for training the regression function.

At step 604, the training images are pre-processed. The training images are pre-processed to normalize the images and reduce noise in the images. At step 606, features are extracted for each pixel of each of the training x-ray images (input examples). For example, the features can be extracted using wavelets. At step 608, the dimensionality of the features is reduced. Steps 604, 606, and 606 of the method of FIG. 6 are performed to the training images similarly to steps 204, 206, and 208 of the method of FIG. 2 described above.

At step 610, the regression function is trained based the extracted features. In particular, a regression function is trained that maps pixels from the input (x-ray) example images to the corresponding output (soft-tissue) example images based on the extracted features. The regression function can be trained using a non-linear regression method, such as k-Nearest-Neighbor regression (kNNR), support vector regression (SVR), Gaussian process regression (GPR). These methods for training the regression function are described in greater detail below.

kNNR is one possible method for predicting the unknown function value of a given point using previously seen input and output pairs. Given a set of training points $S=\{x_1, \ldots, x_n\}$, the kNN estimator is defined as the mean value function of the nearest neighbors:

$$\hat{f}(x) = \frac{1}{Z} \sum_{i=1}^{N(x)} f(x_i)$$

where $N(x) \subset S$ is the set of k nearest points to x, and k is a parameter that can be set by a user. It is possible to utilize a weighted average where the weight of each neighbor is proportional to its distance from x. This uses a special form of weighted regression, and one possible example is using the Gaussian Radial Basis Function (RBF):

$$\hat{f}(x) = \frac{1}{Z} \sum_{i=1}^{N(x)} f(x_i) \exp\left\{-\frac{d(x, x_i)}{\beta}\right\}, \quad (3)$$

where $d(x,x_i) = \|x - x_i\|_2^2$ is the $l_2$ norm, $\beta$ is the variance, and $$Z = \sum_{i=1}^{N(x)} \exp\left\{-\frac{d(x, x_i)}{\beta}\right\}$$

is a normalization factor.

Another possible non-linear regression method for training the regression function is SVR. The goal of $\epsilon$-SVR is to find a function $f$ that has the most $\epsilon$ deviation from the actual targets $y_i$, for all the training data. With a constraint on the flatness of $f$, the standard form of support vector regression ($\epsilon$-SVR) can be formulated as a convex optimization problem as follows:

$$\text{minimize } \frac{1}{2}\|w\|^2 + C\sum_{i=1}^{l}(\xi_i + \xi_i^*)$$

$$\text{subject to } y_i - \langle w, x_i \rangle - b \leq \varepsilon + \xi_i$$

$$\langle w, x_i \rangle + b - y_i \leq \varepsilon + \xi_i^*$$

$$\xi_i, \xi_i^* \geq 0.$$

The above problem is solved using dual problem and quadratic programming. The performance of SVR is very sensitive to the parameters. Because optimizing these parameters is an intractable problem, cross validation via parallel grid search can be used to set the values for the parameters. However, for training a regression function based on the training images, it may be difficult to find good parameters using cross validation, especially when applied to high resolution x-ray images.

According to an advantageous implementation, the regression function can be learned based on Gaussian process regression (GPR). GPR is a generalization of the Gaussian probability distribution over a finite vector space, which governs the properties of functions over a function of space of infinite dimension. In the GPR approach, without parameterizing a function $f$, a probability is assigned to every possible function. Just as Gaussian distribution is specified by its mean vector and covariance matrix, a Gaussian process can be dully specified by its mean function $\mu(x)=E[f(x)]$ and its covariance function $C(x,x')=E[(f(x)-\mu(x))(f(x')-\mu(x'))]$. The covariance function encodes assumptions about the function characteristics (such as smoothness and length-scale) by defining a notion of similarity between two function values. Given the covariance C, the predictive distribution for a new input x is also Gaussian with the following mean and variance:

$$\hat{y}(x)=\mu_y+k(x)K^{-1}y \quad (4)$$

$$\sigma_y^2(x)=C(x,x)-k(x)K^{-1}k(x) \quad (5)$$

where $\mu_y$ is the mean of y in the training set, $k(x)=[C(x,x_1), \ldots, C(x,x_N)]'$, K is the covariance matrix for the training cases $K_{ij}=C(x_i,x_j)$, and $y=[y_1, \ldots, y_N]'$.

A problem with GPR is that the computational complexity grows as $O(n^3)$, where n is the number of training points. Therefore, GPR can have difficulty dealing with a large dataset, such as with the per-pixel image analysis of the present invention. Accordingly, according to an advantageous implementation of the present invention, an approximation method can be used to approximate GPR in order to adapt GPR to the large scale problem. It is possible to approximate GPR using a sparse approximation using inducing variables. When f and $f_*$ are the vectors of the output in the training set and the testing set, respectively, and $u=[u_1, \ldots, u_m]'$ (where m<<n) is the inducing variables with a set of corresponding input locations $X_u$, two inducing conditionals can be specified as follows:

$$\text{training conditional: } p(f|u)=N(K_{f,u}K_{u,u}^{-1}u,K_{ff}-Q_{ff}), \quad (6)$$

$$\text{training conditional: } p(f_*|u)=N(K_{*,u}K_{u,u}^{-1}u,K_{*,*}-Q_{*,*}), \quad (7)$$

where $K_{a,b}$ is the covariance function between the two vectors of function values for two input datasets and $Q_{a,b}=K_{a,u}K_{ff}^{-1}K_{u,b}$, and N refers to a Gaussian distribution. Previously proposed sparse approximations can be categorized according to additional approximation to training and test conditionals into the subset of data (SoD), subset of regressors (SoR), deterministic training conditional (DTC), and partially and fully independent training conditional (PITC and FITC) approximations. A problem with these approximation methods is that they still require the computation of the n×m matrix $K_{f,u}$ in training conditional for all of the approximations. When training data is large, as in the present invention, this matrix may become too large and cause memory problems.

According to an advantageous implementation, a Bayesian Committee Machine (BCM) can be used to approximate the GPR. Although, BCM can be categorized as a PITC approximation, BCM is somewhat different from other PITC approximation methods in the aspect that it is a transductive leaner (i.e., the test inputs have to be known for training) and the inducing inputs $X_u$ are chosen to be test inputs. By utilizing BCM, the resulting approximation does not need to compute the matrix $K_{f,u}$. The core idea of BCM is that the training data is split into M data sets $D=\{D^1, \ldots, D^M\}$ of approximately the same size. For example, a k-means algorithm can be used for clustering of the training data. M regressors are then trained separately on each training data set. The predictive distribution of testing data then has the following mean and inverse covariance:

$$\hat{E}(f_* \mid D) = C^{-1}\sum_{i=1}^{M} \text{cov}(f_* \mid D^i)^{-1}E(f_* \mid D^i) \quad (8)$$

with $$C = \hat{\text{cov}}(f_* \mid D)^{-1} = -(M-1)(K_{*,*})^{-1} + \sum_{i=1}^{M} \text{cov}(f_* \mid D^i)^{-1}, \quad (9)$$

where the a priori predictive density for the new testing data is assumed to be a Gaussian with zero mean and covariance $K_{*,*}$, and the posterior predictive density for each regressor module is a Gaussian with mean $E(f_*|D^i)$ and covariance $\text{cov}(f_*|D)$. The inducing variables are the test inputs and the matrix $K_{f,u}$ can be approximated by the sum of the covariances for the individual modules.

As described above, a regression function trained using the method of FIG. 6 can be used to suppress bone structures in an x-ray image using the method of FIG. 2. According to an advantageous embodiment of the present invention, wavelet features can be extracted for input x-ray images and the training images, and the regression function can be trained using based on the wavelet features using GPR approximated using BCM.

Figure 7:
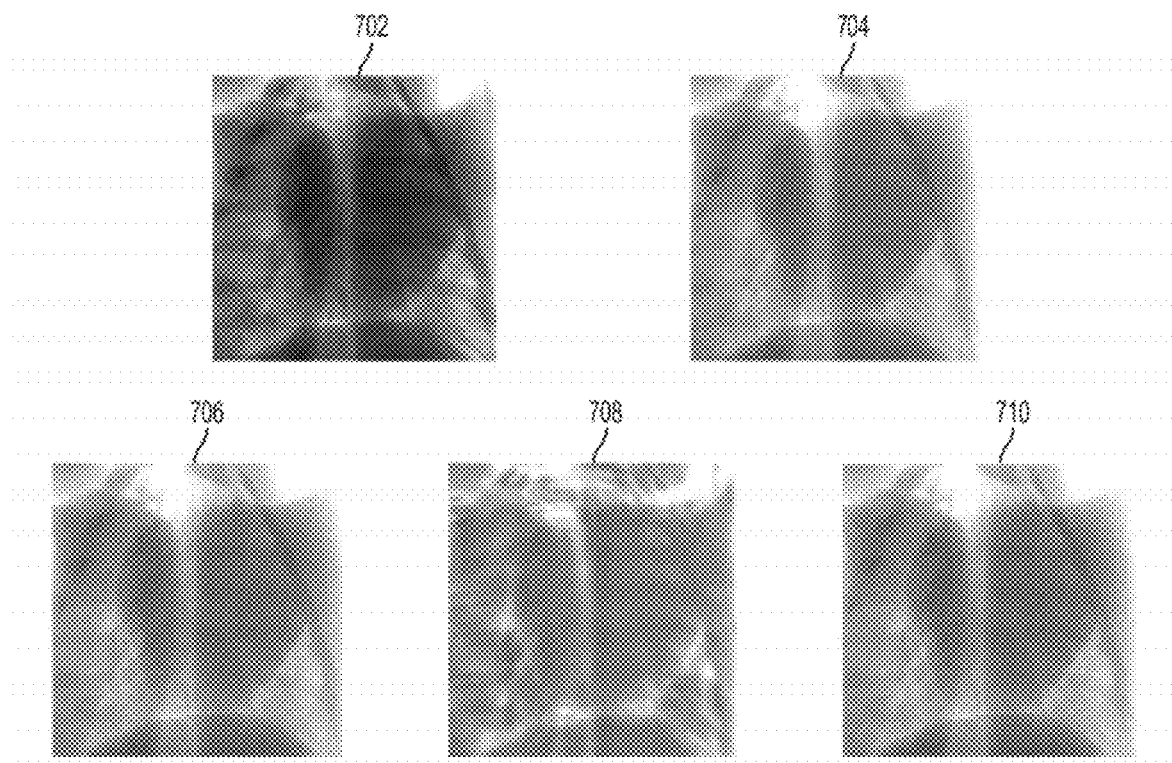
FIGS. 7-10 illustrate exemplary results of bone structure suppression in x-ray images using the method of FIG. 2.

FIGS. 7-10 illustrate exemplary results of bone structure suppression in x-ray images using the method of FIG. 2. FIG. 7 shows exemplary bone structure suppression results using different regression models. As illustrated in FIG. 7, image 702 is an input chest x-ray image including bone structures and image 704 is the true soft-tissue image obtained by dual energy imaging. Images 706, 708, and 710 are soft-tissue images generated from the chest x-ray image 702 using the method of FIG. 2 with the regression function trained using kNNR, SVR, and BCM to approximate GPR, respectively. Images 706, 708, and 710 are generated using the LM filter bank to extract image features, and no dimensionality reduction.

Figure 8:
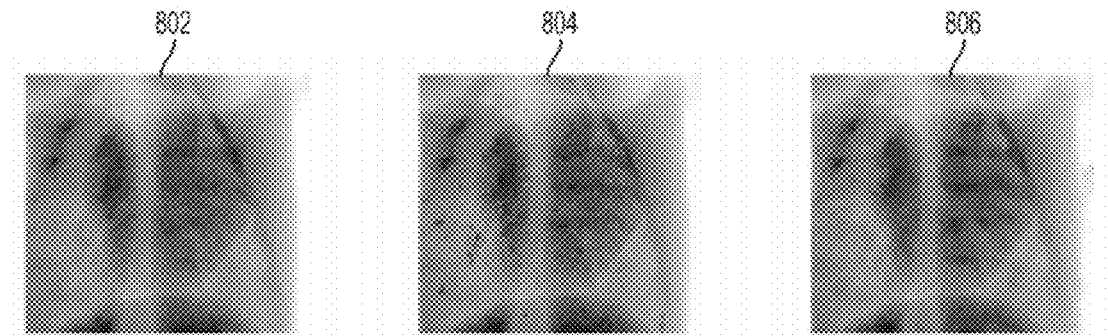

FIG. 8 show exemplary bone structure suppression results using different regression models and dimensionality reduction. As illustrated in FIG. 8, image 802 is a true soft-tissue image obtained by dual energy imaging, and images 804 and 806 are soft-tissue images generated using the method of FIG. 2 with the regression function trained using kNNR and BCM, respectively. Images 804 and 806 are generated using the LM filter bank to extract image features, and PCA for dimensionality reduction.

Figure 9:
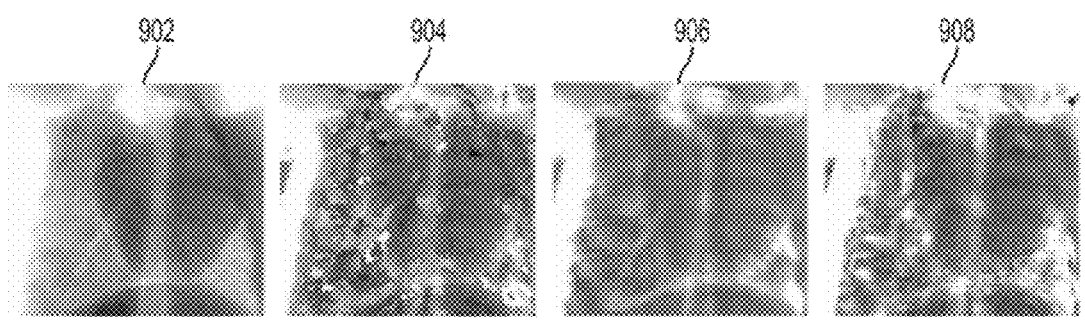

FIG. 9 illustrates bone structure suppression results using different regression models, where the images for training and testing were not normalized with the pre-processing step. As illustrated in FIG. 9, image 902 is a true soft-tissue image obtained by dual energy imaging, and images 904, 906, and 908 are soft-tissue images generated using the method of FIG. 2 with the regression function trained using kNNR, SVM, and BCM, respectively. Images 904, 906, and 908 are generated using the LM filter bank to extract image features.

Figure 10:
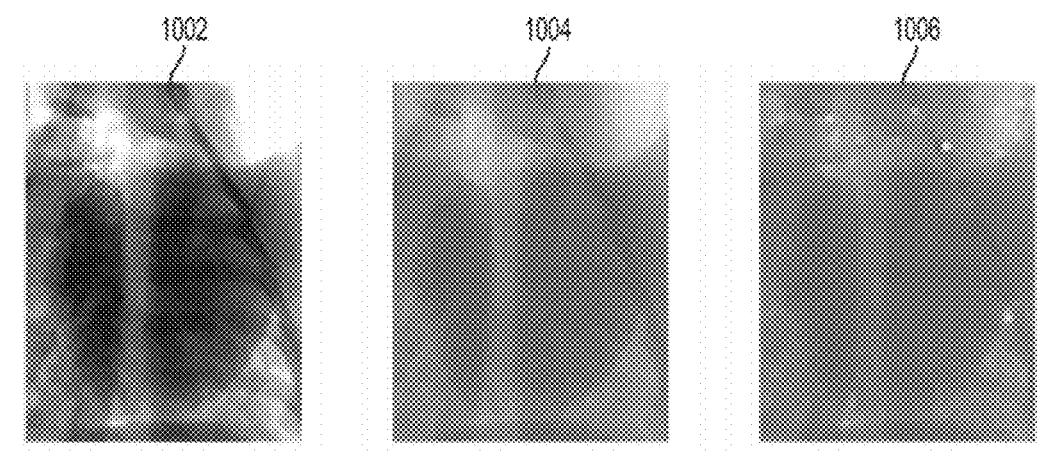

FIG. 10 illustrates bone structure suppression using wavelet features and BCM. As illustrated in FIG. 10, image 1002 is an input chest x-ray image including bone structures and image 1004 is the true soft-tissue image obtained by dual energy imaging. Image 1004 is a soft-tissue image generated using the method of FIG. 2 with the regression function trained using BCM to approximate GPR, and wavelet image features.

Figure 11:
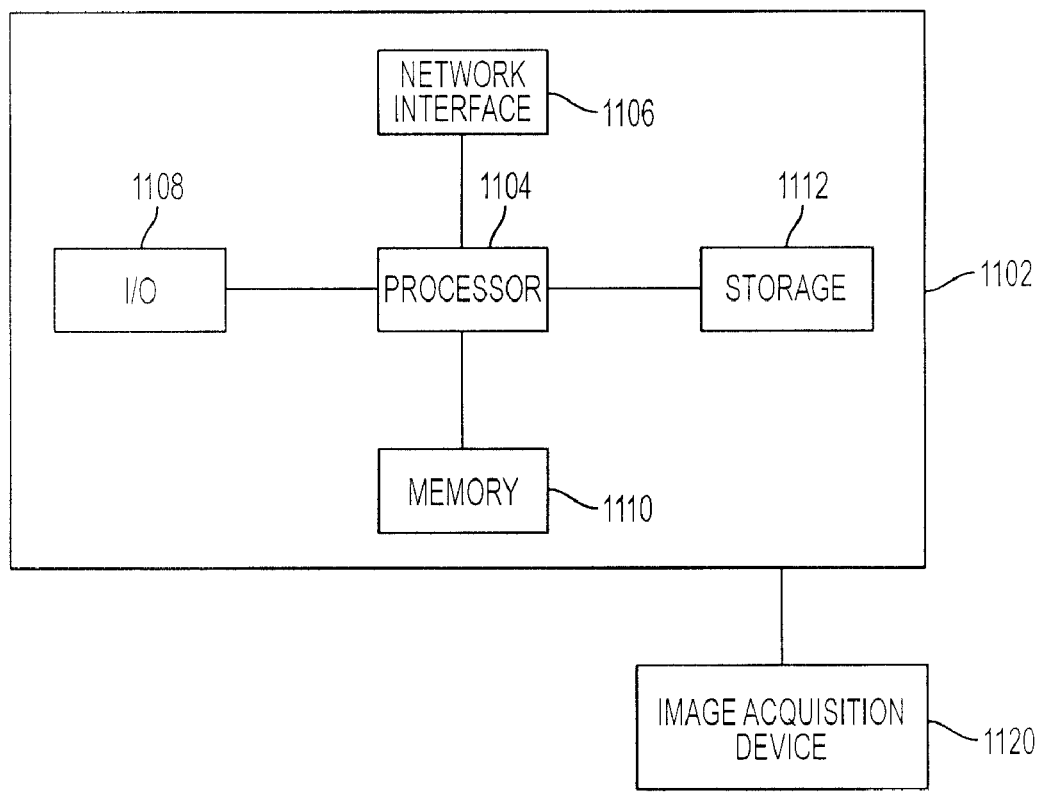
FIG. 11 is a high level block diagram of a computer capable of implementing the present invention.

The above-described methods for bone structure suppression x-ray images and training a regression function for bone structure suppression may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium, (e.g., magnetic disk) and loaded into memory 1110 when execution of the computer program instructions is desired. Thus, all method steps described above for registering dual energy images, including the method steps illustrated in FIG. 2 and FIG. 6, may be defined by the computer program instructions stored in the memory 1110 and/or storage 1112 and controlled by the processor 1104 executing the computer program instructions. An image acquisition device 1120, such as an X-ray imaging device, can be connected to the computer 1102 to input images to the computer 1102. It is possible to implement the image acquisition device 1120 and the computer 1102 as one device. It is also possible that the image acquisition device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for suppressing bone structures in an x-ray image, comprising:
    receiving an x-ray image having a plurality of pixels;
    extracting a set of wavelet features for each pixel in the x-ray image; and
    generating a soft-tissue image without bone structures from the x-ray image by using a trained regression function to determine an intensity value for the soft-tissue image corresponding to each pixel in the x-ray image based on the set of wavelet features extracted for each pixel in the x-ray image.

2. The method of claim 1, further comprising:
    normalizing the x-ray image prior to extracting the set of features for each pixel in the x-ray image.

3. The method of claim 2, wherein said step of normalizing the x-ray image comprises:
    normalizing the x-ray image using multiple iterations of Gaussian blurring.

4. The method of claim 1, wherein said step of extracting a set of wavelet features for each pixel in the x-ray image comprises:
    calculating a vector of wavelet values for each pixel in the x-ray image using multiple wavelet functions corresponding to multiple scales of the x-ray image.

5. The method claim 1, further comprising:
    reducing a dimensionality of the set of wavelet features for each pixel of the x-ray image prior to generating the soft-tissue image.

6. The method of claim 5, wherein said step of reducing a dimensionality of the set of wavelet features for each pixel of the x-ray image comprises:
    linearly mapping the set of wavelet features for each pixel to a lower dimensional space.

7. The method of claim 1, wherein said trained regression function is trained using Bayesian Committee Machine (BCM) to approximate Gaussian Process Regression (GPR).

8. The method of claim 1, wherein said trained regression function is trained using one of k-Nearest-Neighbor regression (kNNR), support vector regression (SVR), and Gaussian process regression (GPR).

9. A method for suppressing bone structures in an x-ray image, comprising:
    receiving a plurality of sets of training images, each set of training images comprising a training x-ray image and a corresponding training soft-tissue image;
    extracting a set of wavelet features for each pixel in each of the training x-ray images; and
    training a regression function to suppress bone structures in x-ray images based on the extracted wavelet features for the training x-ray images and the corresponding training soft-tissue images.

10. The method of claim 9, further comprising:
    normalizing the training x-ray images and corresponding training soft-tissue images prior to extracting the set of wavelet features for each pixel in each of the training x-ray images.

11. The method of claim 9, further comprising:
    reducing a dimensionality of the set of wavelet features for each pixel of each of the training x-ray images prior to training the regression function.

12. The method of claim 9, wherein said step of training a regression function to suppress bone structures in x-ray images comprises:
    training the regression function to predict intensity values of pixels of the training soft-tissue images from the sets of wavelet features extracted for corresponding pixels of the training x-ray images.

13. The method of claim 9, wherein said step of training a regression function to suppress bone structures in x-ray images comprises:
    training the regression function using Bayesian Committee Machine (BCM) to approximate Gaussian process regression (GPR).

14. The method of claim 9, further comprising:
    receiving an input x-ray image without a corresponding soft-tissue image; and
    generating a soft-tissue image from the input x-ray image using the trained regression function.

15. An apparatus for suppressing bone structures in an x-ray image, comprising:
    means for receiving an x-ray image having a plurality of pixels;

means for extracting a set of wavelet features for each pixel in the x-ray image; and means for generating a soft-tissue image without bone structures from the x-ray image by using a trained regression function to determine an intensity value for the soft-tissue image corresponding to each pixel in the x-ray image based on the set of wavelet features extracted for each pixel in the x-ray image.

16. The apparatus of claim 15, further comprising:

means for normalizing the x-ray image prior to extracting the set of features for each pixel in the x-ray image.

17. The apparatus claim 15, further comprising:

means for reducing a dimensionality of the set of wavelet features for each pixel of the x-ray image prior to generating the soft-tissue image.

18. The apparatus of claim 15, wherein said trained regression function is trained using Bayesian Committee Machine (BCM) to approximate Gaussian Process Regression (GPR).

19. An apparatus for suppressing bone structures in an x-ray image, comprising:

means for receiving a plurality of sets of training images, each set of training images comprising a training x-ray image and a corresponding training soft-tissue image;

means for extracting a set of wavelet features for each pixel in each of the training x-ray images; and means for training a regression function to suppress bone structures in x-ray images based on the extracted wavelet features for the training x-ray images and the corresponding training soft-tissue images.

20. The apparatus of claim 19, further comprising:

means for normalizing the training x-ray images and corresponding training soft-tissue images prior to extracting the set of wavelet features for each pixel in each of the training x-ray images.

21. The apparatus of claim 19, further comprising:

means for reducing a dimensionality of the set of wavelet features for each pixel of each of the training x-ray images prior to training the regression function.

22. The apparatus of claim 19, wherein said means for training a regression function to suppress bone structures in x-ray images comprises:

means for training the regression function using Bayesian Committee Machine (BCM) to approximate Gaussian process regression (GPR).

23. A non-transitory computer readable medium encoded with computer executable instructions for suppressing bone structures in x-ray images, the computer executable instructions defining steps comprising:

receiving an x-ray image having a plurality of pixels;

extracting a set of wavelet features for each pixel in the x-ray image; and generating a soft-tissue image without bone structures from the x-ray image by using a trained regression function to determine an intensity value for the soft-tissue image corresponding to each pixel in the x-ray image based on the set of wavelet features extracted for each pixel in the x-ray image.

24. The non-transitory computer readable medium of claim 23, further comprising computer executable instructions defining the step of:

normalizing the x-ray image prior to extracting the set of features for each pixel in the x-ray image.

25. The non-transitory computer readable medium claim 23, further comprising computer executable instructions defining the step of:

reducing a dimensionality of the set of wavelet features for each pixel of the x-ray image prior to generating the soft-tissue image.

26. The non-transitory computer readable medium of claim 23, wherein said trained regression function is trained using Bayesian Committee Machine (BCM) to approximate Gaussian Process Regression (GPR).

27. A non-transitory computer readable medium encode with computer executable instructions for suppressing bone structures in an x-ray image, the computer executable instructions defining steps comprising:

receiving a plurality of sets of training images, each set of training images comprising a training x-ray image and a corresponding training soft-tissue image;

extracting a set of wavelet features for each pixel in each of the training x-ray images; and training a regression function to suppress bone structures in x-ray images based on the extracted wavelet features for the training x-ray images and the corresponding training soft-tissue images.

28. The non-transitory computer readable medium of claim 27, further comprising computer executable instructions defining the step of:

normalizing the training x-ray images and corresponding training soft-tissue images prior to extracting the set of wavelet features for each pixel in each of the training x-ray images.

29. The non-transitory computer readable medium of claim 27, further comprising computer executable instructions defining the step of:

reducing a dimensionality of the set of wavelet features for each pixel of each of the training x-ray images prior to training the regression function.

30. The non-transitory computer readable medium of claim 27, wherein the computer executable instructions defining the step of training a regression function to suppress bone structures in x-ray images comprise computer executable instructions defining the step of:

training the regression function using Bayesian Committee Machine (BCM) to approximate Gaussian process regression (GPR).

* * * * *